Dec. 14, 1965    R. A. COEN    3,223,232
PACKAGE OF FRAGILE ARTICLES
Filed Dec. 20, 1961    4 Sheets-Sheet 1

INVENTOR.
RICHARD A. COEN
BY
*Julius J. Denzler*
ATTORNEY

Dec. 14, 1965   R. A. COEN   3,223,232
PACKAGE OF FRAGILE ARTICLES
Filed Dec. 20, 1961   4 Sheets-Sheet 3
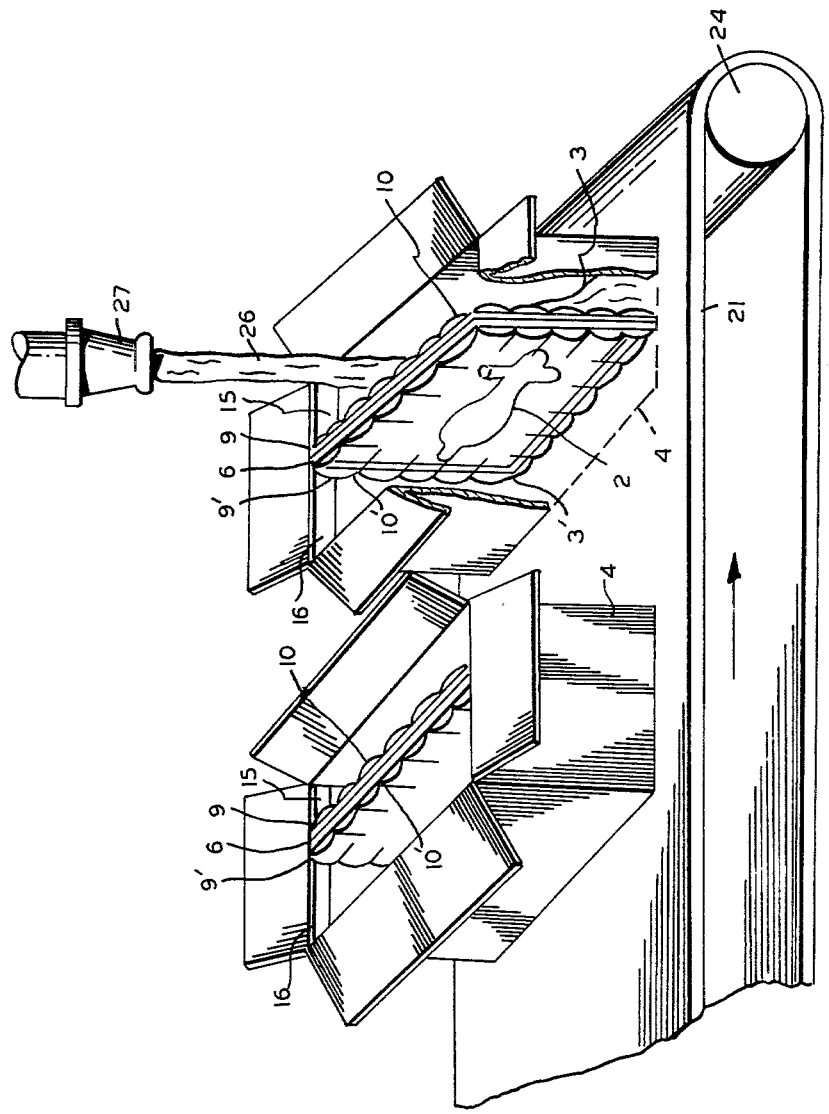
INVENTOR.
RICHARD A. COEN
BY
*Julius J. Denzler*
ATTORNEY Dec. 14, 1965  R. A. COEN  3,223,232
PACKAGE OF FRAGILE ARTICLES
Filed Dec. 20, 1961  4 Sheets-Sheet 4

INVENTOR.
RICHARD A. COEN
BY
Julius J. Denzler
ATTORNEY ial No. 160,843
United States Patent Office
3,223,232
Patented Dec. 14, 1965

3,223,232
PACKAGE OF FRAGILE ARTICLES
Richard A. Coen, Fords, N.J., assignor to Nopco Chemical Company, Newark, N.J., a corporation of New Jersey
Filed Dec. 20, 1961, Ser. No. 160,843
6 Claims. (Cl. 206—65)

This invention relates to the art of packing or packaging articles, objects and materials of various kinds for transportation, preservation, storage etc., and it is the general object of the invention to provide simple, practical and dependable means and methods for packaging or packing articles and materials that are fragile, delicate and easily damaged.

There are many classes of objects and materials that require special packing and protection for the purpose of shipping, storing or for merely preserving the same. These include fragile and perishable articles such as delicate laboratory glassware, electronic, electrical and X-ray equipment having thin easily broken glass envelopes, shock sensitive material such as those containing fulminates or the like, delicate optical instruments and components, medical and surgical equipment, valuable and fragile antiques and archeological objects etc., vibration and shock sensitive mechanisms, and the like.

Conventional procedures for packing or packaging the above materials which utilize foamed resins such as polyurethane as a cushioning medium for said articles have proven costly and inefficient. This is true since in order to obtain protection against breakage or other damage, the article that is to be placed in the container before the cushioning material foamed and the cushioning material therefore had to foam around the material after it was packaged. In order to gain access to the material within the package it is necessary to physically tear into the foam, thus making the package and packing material unusable after the article is removed. Another disadvantage of the known packaging or packing procedures utilizing foamed resins such as polyurethane is that they provided no easy or convenient method of removing the object from the carton or box without completely damaging the package. Thus, as seen in practice, most of the chipping or damage of an article packaged in this manner occurs during the final step of removing the article from the package. Another disadvantage of utilizing previous packing or packaging procedures is that it is difficult, if not impossible, to center the article within the container so as to afford the article the maximum cushioning protection. This lack of centering makes these containers bulky, hard to carry or store since they are subject to tipping, inverting, etc. Besides the lack of centering provided by the prior art method of packing and packaging, makes it impossible to safely store, pack or package a plurality of different objects at different locations within the container so as to utilize the maximum space within any given container.

An object of this invention is to provide a means and method of packing or packaging a potentially damageable article or a plurality of articles to provide maximum protection.

A further object of this invention is to provide a means and method of packing or packaging a potentially damagable material to provide maximum protection against vibrational shock, thermal conditions, impact, inverting, tipping and other potentially damaging treatment.

A further object of this invention is to provide a package utilizing a foamed plastic as the cushioning material whereby the contents of the package may be removed simply and easily from the package without destroying the foamed package.

A further object of this invention is to provide a packing means that can be reused upon subsequent occasions.

A further object of this invention is to provide a packaging means that can be utilized to provide maximum protection for potentially damagable articles which are packed at different and separate levels within the packaging means.

A further object of this invention is to provide a method of packing or packaging potentially damagable articles so as to be able to place the article at any desired position within the container.

Other objects and features of the invention will become apparent from the following detailed description of several typical forms of packaging or packing and methods of providing the same according to this invention, throughout which description reference will be made to the accompanying drawings wherein:

FIGURE 4 is a perspective schematic view showing a continuous vertical pour method of packaging or packing objects according to another embodiment of the invention;

Figure 1:
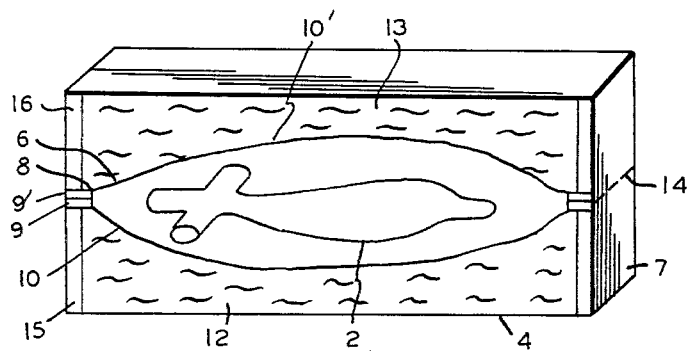
FIGURE 1 is a vertical cross sectional view of the package or packing according to the invention.

Referring now to FIGURE 1 which is a vertical cross sectional view of the package or packing arrangement according to the invention, it can be seen that the potentially damagable material or object 2 which in this case is a separatory funnel is packed in a container 4. The container 4 may be constructed from any solid, rigid material such as cardboard, wood, metal or ceramic or may be in the nature of a mold lined with paper, cellophane, fabric or the like. On the other hand, the container 4 may be constructed from a hard rigid plastic. The potentially destructable material 2 may be placed in a protective envelope 6. This protective envelope 6 may be composed of a rigid frame member 8 which may consist of bottom and top frame halves 9 and 9' which may be sealed together by means of glue, adhesive, tacking or the like to form said solid rigid frame member 8. Alternatively frame member 8 can be a unitary frame which upon cutting of the final package, will be cut into the halves which correspond to 9 and 9'. The frame halves 9 and 9' which are adapted to be separated from each other by means of tearing, cutting, etc., carry covering sheets 10 and 10' respectively. The covering sheet 10 which is attached to the bottom frame half 9 and the covering sheet 10' which is attached to the top frame half 9' may be made out of any rigid or flexible plastic sheet material such as polyethylene, "Mylar" (polyethylene terephthalate), polystyrene, polyvinyl chloride, polyvinylidene chloride, etc. The covering sheets 10 and 10' also may be made of waxed paper, glassine paper, cellophane, or the like.

It is a feature of this invention that envelope 6, containing article or object 2 which is sealed between frame half 9 and frame half 9', is surrounded within the container 4 by a bottom cushioning layer 12 and a top cushioning layer 13, said cushioning layers consisting of foamed resinous material. The foamed resinous cushioning layers 12 and 13 may directly adhere to covering sheet 10 of frame half 9 and covering sheet 10' of frame half 9' respectively. The article 2 may be vacuum sealed within envelope 6. Also within the seal provided by covering sheets 10 and 10' there may be placed a preservative, grease, anti-rust compound etc., to preserve the article 2 during storage. The covering sheets 10 and 10' provide a liquid and/or air tight seal for article 2. In order to support envelope 6 clear of all the walls of the container 4 and in the desired position, support members 15 and 16 are supplied. Support members 15 may be attached to the bottom wall of the container 4 while support members 16 may be attached to the top wall of container 4. The support members 15 and 16 may be made out of corrugated cardboard, rigid plastic or metal.

It will be observed that the support members 15 and 16 can support envelope 6 containing the potentially damageable material 2 anywhere within the container 4. Also it can be observed that the potentially damageable material is entirely enclosed within the plastic sheet coverings 10 and 10' which are surrounded by the energy absorbing and shock impact resistant foamed plastic layers 12 and 13. By means of the supporting members 15 and 16, envelope 6 may be located within container 4 in the position corresponding to the cutting plane of container 4, which may be designated by a line 14 on the outside walls 7 of container 4. Envelope 6 may be situated in container 4 so that covering sheet 10 lies below line 14 and covering sheet 10' lies above line 14. Upon inserting a knife through line 14, frame half 9' separates from frame half 9 allowing free access to article 2 without cutting, tearing or removing foamed plastic layers 12 and 13.

Figure 2:
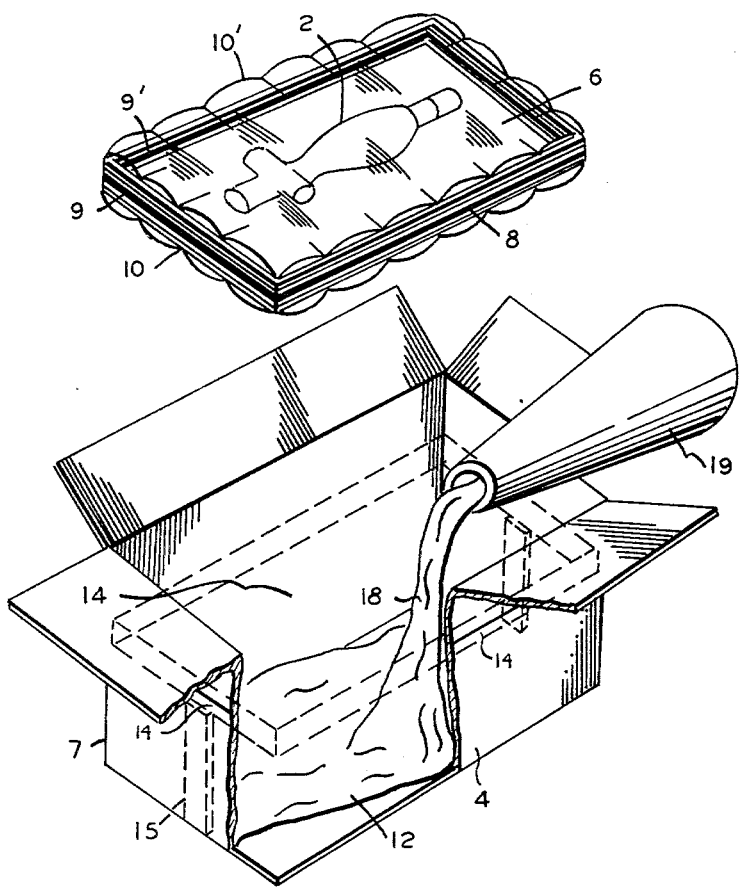
FIGURE 2 is a perspective schematic view of the method of packaging according to this invention.

FIGURE 2 is a perspective schematic view illustrating the packaging method and package of this invention. Container 4 having supporting members 15 which may be attached to the container 4 may be partially filled with a half shot of foamable material 18, which upon foaming, forms the bottom foamed cushioning layer 12. The shot of foamable material may be poured into the open container 4 from a supply source 19. The supporting members 15 may be positioned within container 4 so as to support envelope 6 at the proper cutting plane level which may be designated by the horizontal line 14 and which may be drawn on the outside walls 7 of container 4. Envelope 6 which is then placed on supporting members 15 may be constructed by placing the potentially damageable object 2, which in this case is a glass separatory funnel, upon the bottom covering sheet 10 of frame half 9. Top frame half 9' carrying the top covering sheet 10' may be then attached to the frame half 9 by means of heat sealing, gluing, stapling or the like, so as to provide a seal for the potentially damageable objects 2.

Envelope 6 containing the potentially damageable objects 2 may be then placed over the layer 12 before any substantial foaming takes place. Upon foaming, layer 12 which may adhere to the bottom covering sheet 10 of the envelope 6, supports in conjunction with members 15 envelope 6 within the container 4 in a position corresponding to line 14. After envelope 6 is positioned within the container 4, a second half shot of foamable material 18 may be then poured into container 4 above envelope 6. Upon foaming, the half shot 18 forms the top foamed cushioning layer 13 (FIGURE 1) which supports envelope 6 in the desired indicated position. The step of pouring the second half shot 18 into the container may be preferably carried out immediately after envelope 6 is positioned within container 4 so as to prevent envelope 6 from moving out of its predetermined position. Container 4 may then be closed and sealed. After proper aging container 4 is ready for shipment.

By the above mentioned procedure, the potentially damageable material or object 2 is safely packaged in container 4 ready for shipment. As can be seen from the above description, the article 2 may be placed in the container in any desired position before foaming completely takes place. Upon foaming the foamed materials form the cushioning layers 12 and 13 which protects the potentially damageable article 2 and support the article in the desired position. Hence by this method, it is possible to position the article or object 2 in the most desirable position for shipping so as to prevent the packaged containers from being too bulky. An additional advantage of this method is that it prevents any movement of the article within container 4. By this method, the articles or article 2 can be positioned within the container so that it may be easily removed from the package without the necessity of tearing through the foamed material.

Figure 3:
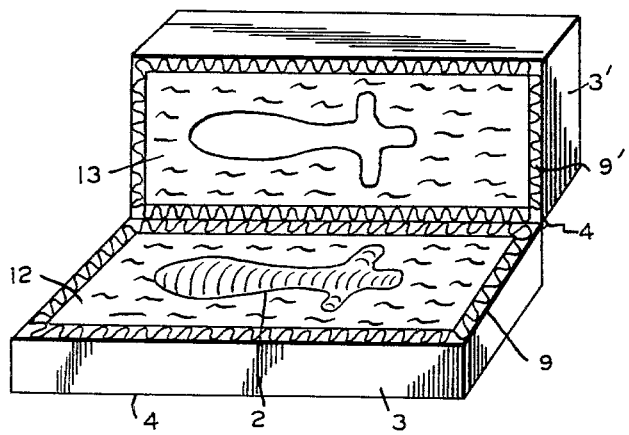
FIGURE 3 is a perspective view of the packed or packaged container of this invention after the package has been opened.

As can be seen from FIGURE 3 which is a perspective view of container 4 of this invention opened up and before the potentially breakable contents contained within this package are removed, container 4 containing the foamed resin layers 12 and 13 and the envelope 6 may be easily reused to ship or store potentially damageable objects of approximately the same size and shape. In opening the container 4 to remove the potentially damageable material or object 2, the container 4 may be cut by such means as a knife (not shown) along dotted line 14 (FIGURES 1 and 2). By cutting along line 14 the seal between frame half 9 and 9' is destroyed, allowing the rigid frame member 8 (FIGURES 1 and 2) to open into the two frame halves 9 and 9' so that the object 2 can be easily and neatly removed from the container 1 without destroying the packaging construction and tearing through the foamed resin cushioning layers 12 and 13 of the container 4. In this manner the object 2 may be easily removed from the container 4 without danger of chipping or damaging the article 2 during its removal. As can be seen from FIGURE 3, the open container 2 has a bottom compartment 3 composed of the bottom foamed layer 12 and frame half 9 and a top compartment 3' composed of the top foamed layer 13 and the frame half 9'. Thus in the opened package, the foamed cushioning material is in the same position as it was in the sealed container. Hence in order to remove the article from the container 4 there is no need to touch the foamed cushioning layers 12 and 13.

In order to reuse the container 4 the article 2, or similar articles, may be placed in the depressions in the foam around the original article and then the two compartments 3 and 3' of the container may be closed and sealed by any conventional means and the unit is ready for shipment. In this process frame half 9 may be sealed to frame half 9' or the frame halves 9 and 9' may be just placed on top of each other. Frame half 9 may be sealed to frame half 9' by any of the conventional methods of sealing such as heat sealing, tacking, stapling, gluing or the like.

FIGURE 4 illustrates a method of preparing the package of the invention embodying the vertical pouring procedure whereby the packing operation is performed continuously. As seen in FIGURE 4, a series of containers 4 are vertically placed on a conveyer belt 21 which may be driven at both ends by rollers 24. Within each of the containers 4 may be placed envelopes 6 which may comprise frame halves 9 and 9' containing a covering sheet 10 or 10' respectively which enclose the potentially damagable object or article 2. Envelope 6 which divides the container 4 into two compartments 3 and 3' is maintained in the desired position within container 4 by means of support members 15 and 16. The foam material in liquid form 26 is poured into each compartment 3 and 3' of the container 4 by means of an injection spout or nozzle 27 of an apparatus for manufacturing foamed plastics (not shown) such as the apparatus disclosed by Hoppe in U.S. Patent 2,764,565. As the compartments 3 or 3' of container 4 pass directly under the injection spout or nozzle 27, they receive a shot of foam material 26 in liquid form. After compartments 3 or 3' pass from the injection spout or nozzle 27, the liquid foam material rises and foams within the compartments 3 or 3' where a solid foam forms which completely fills the compartments 3 or 3'. The container 4 may then travel to another station where it then may be sealed (not shown). After sealing, the container may then be aged before it is ready for shipment. Aging may be accomplished by leaving the container standing for one day at room temperature.

Figure 5:
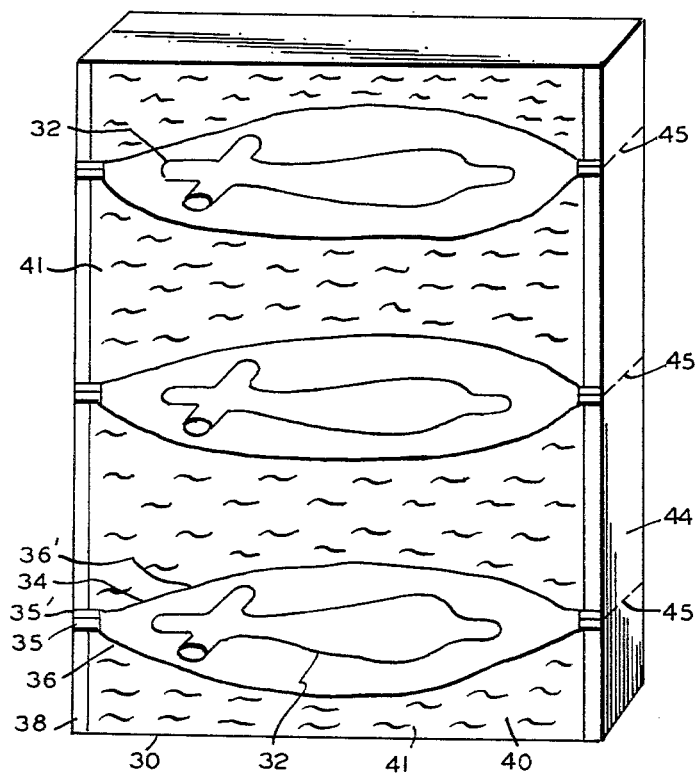
FIGURE 5 is a vertical cross sectional view showing a multiple packaging arrangement according to another embodiment of the invention.

By the procedure of this invention outlined in FIGURES 2 and 4, objects may be multi-packed within the given single container 4. FIGURE 5 is an illustration of objects multi-packaged within a single container 30 according to this invention. In this case the potentially damagable objects 32 may be enclosed within different envelopes 34, each envelope 34 comprising frame halves 35 and 35' and covering sheets 36 and 36'. The frame halves 35 and 35' may be held within the container in the desired position by means of support members 38 so that they form compartments 40 within the container 30. A foamable resin mixture may be placed in each of the compartments 40 by means illustrated in FIGURES 2 and 4 so that upon foaming the resin expands, solidifies and adheres or partially adheres to the covering sheets 36 and 36' to form the foamed layers 41 within each compartment 40 which may support the bottom and the top of envelope 34 in a desired position. Corresponding to the ends of the sets of supports 38 which hold the frame halves 35 and 35' in the desired positions are lines 45 drawn on the outer surface 44 of the container which designate the cutting planes whereby the package may be opened easily without cutting or tearing into the foam and the objects 32 removed from their various envelopes 34. A further advantage of this method is that only some of the desired materials or objects 32 may be removed from the container 30 at any one time allowing the container to be resealed at the point at which the desired object is removed and the balance of the objects 32 saved for reshipment or later removal. Since this is the case, the box or container 30 after opening may be reused by taping or sealing the cut portions of the container 30.

As the protective cushioning layers 12, 13 and 41 within the package or container of this invention, it is preferred that a foamed polyurethane resin having a density from 0.5 to 1.5 lbs. cu. ft. be used since these resins are low in cost and give maximum protection to the potentially damagable article or articles that are to be packed. Foamed resins having higher or lower densities may be utilized in this invention without altering the beneficial results obtained by the package of this invention.

The preferred low density polyurethane resins for use in this invention are reaction products of polyether or polyester resins with a polyisocyanate in the presence of water, an activator and/or a surface active agent. In most cases, a halogenated saturated aliphatic hydrocarbon such as Freon may be added as a blowing agent. The liquid foamable resin may be supplied to the container 4 or 30 by means of a total prepolymer system i.e. where a branched chain polyester resin or a polyether resin is reacted in the absence of water with an excess over stoichiometric amount of polyisocyanate and the foamed resin is formed by mixing this reaction product with water, an activator, and/or a surface active agent; by means of a partial (quasi) prepolymer system i.e. where a branched chain polyester resin or a polyether resin is reacted in the absence of water with an excess over stoichiometric amount of polyisocyanate and the foamed resin is formed by mixing this reaction product with a branched chain polyester or polyether resin, water, an activator and/or a surface active agent, or a one shot system, i.e. where a polyester resin or a polyether resin, a polyisocyanate, water and an activator or catalyst are brought into intimate contact by agitation to form the foamed resin. In all of these cases, a saturated aliphatic hydrocarbon such as Freon may be added with water and the activator as a blowing agent.

Typical polyether and polyester resins, polyisocyanates, activators, surface active agents for producing the polyurethane resin which may be used as the protective cushioning material in this invention are disclosed by the Freeman U.S. 2,895,603, Simon et al., U.S. 2,897,641, U.S. 2,591,884 and Hoppe U.S. 2,764,565 patents. Any polyurethane foam may be utilized in this invention. The polyurethane foams utilized may have varying degrees of flexibility and resilience. The foams may vary from the relatively unyielding and rigid to relatively flexible and resilient depending upon the article that is to be packaged. Other foamed materials besides the polyurethanes may be used as the cushioning material in the package of this invention. These include foamed polyethylene, foamed polystyrene, etc.

The following examples are directed to typical preparations of foamed resins that can be used for the cushioning material of the package of this invention. These examples are shown for the purpose of illustrating certain formulations of foamed resins which can be utilized in the invention and are not to be construed as limiting the invention to those formulations.

*Example I*

30 grams of a polyester component prepared from 1 mole of glycerol, 1.5 moles of phthalic anhydride and 0.5 mole of oleic acid, and 0.16 gram of water, 20 grams of a mixture comprising 1 mole of meta-toluene diisocyanate and 0.065 mole of O-dihydroxybenzene and, 1 gram of stainless steel lining powder are mixed together at a temperature of about 140° F. for a period of three minutes just at the point of addition into container 4 or 30 by means a motor driven stirrer. After mixing for three minutes the mixture is poured into the container 4 or 30 where it reacts and foams.

*Example II*

100 parts by volume of a polyester prepared from 16 moles of adipic acid, 16 moles of diethylene glycol and 1 mole of trimethylolpropane, held at a temperature of 22° C., 47 parts by volume of toluene diisocyanate held at a temperature of 18° C., and 10 parts by volume of an activator mixture as described below, held at a temperature of 18° C., were brought together using the mixture apparatus described in FIGURE 4 of the Hoppe Patent U.S. 2,764,565 and injected into the container of this invention. The activator mixture consisted of 3 parts by volume of the adipic ester of N-diethyl amino ethanol, 1 part by volume of ammonium oleate, 1.5 parts by volume of sulphonated castor oil, 1.5 parts by volume of water and 0.5 part by volume of paraffin oil.

*Example III*

60 parts by weight of a polyester component prepared from 4 moles of glycerol, 2.5 moles of adipic acid and 0.5 mole of phthalic anhydride are mixed with 40 parts by weight of an activator component comprising 39 parts by weight of meta toluene diisocyanate, 0.5 part by weight of zinc stearate and 0.5 part by weight of aluminum leafing powder. Mixing for 30 seconds of the two components, by means of a motor driven stirrer, was carried out before the components were poured into the container of this invention.

Having described my invention what I claim is new and desire to secure by Letters Patent is:

1. An easily rupturable package for packaging potentially damageable articles comprising a container having an outside and inside surface, said container having at least one substantially continuous designated line extending substantially around said outside surface of said container, at least one protective envelope positioned in said container, said envelope comprising two sheets and a rigid frame member supporting said sheets only at the peripheries thereof, said frame member having connecting sides, top and bottom, said frame sides being adapted upon cutting to separate, said frame member being positioned in said container substantially coextensive with said continuous line, said top side of said frame being above said line and said bottom side of said frame being below said line, one of said sheets connected to the bottom side of said frame member and the other of said sheets connected to the top side of said frame member so as to define a completely enclosed space, said sheets being positioned out of contact with each other in said top and bottom members of said frame, said articles being enclosed within said enclosed space, a plurality of solid supporting means positioning said frame member substantially coextensive with said continuous line, a mass of cellular plastic material supporting said bottom side of said envelope within said container in said desired position and a separate mass of cellular plastic material supporting said top side of said envelope within said container in said desired position.

2. The means of claim 1 wherein said plastic material is foam polyurethane.

3. An easily rupturable package for packaging potentially damageable articles comprising a container having outside and inside surfaces, said container having a plurality of substantially continuous designated lines extending substantially around the outside surface of said container, a plurality of protective envelopes positioned within said container, each of said envelopes comprising two sheets and a rigid frame member supporting said sheets only at the peripheries thereof, each of said frame members having connecting sides top and bottom, said sides being adapted on cutting to separate, each of said frame members being positioned in said container substantially coextensive with one of said continuous lines, each of said top sides of said frame lying above said line with which it is coextensive and each of said bottom sides of said frame lying below said line with which it is coextensive, one of said sheets connected to each of said bottom sides of said frame members and the other of said sheets connected to each of the top sides of said frame members so as to define completely enclosed spaces, said sheets being positioned out of contact with each other in top and bottom members of the frame, said articles being enclosed within each of said enclosed spaces, a plurality of supporting means positioning said frame members substantially coextensive with each of said continuous lines, a plurality of separate masses of yielding cellular plastic material supporting each of said bottom sides of said envelope within said container in said position and a plurality of separate masses of cellular plastic material supporting each of said top sides of said envelopes within said container in said position.

4. Means of claim 3 wherein said plastic material is foam polyurethane.

5. An easily rupturable package for packaging potentially damageable articles comprising a container having outside and inside surfaces, said container having a continuous designated line extending substantially around the outside surface of said container, a protective envelope positioned within said container substantially coextensive with said continuous line, said envelope comprising two sheets and a rigid frame member supporting said sheets only at the peripheries thereof, said frame member having connecting sides, top and bottom, said sides being adapted on cutting to separate, said top side of said frame member being above said line, said bottom side of said frame member being below said line, one of said sheets connected to said top side of said frame member and the other of said sheets connected to the bottom side of said frame member so as to define a completely enclosed space, said sheets being positioned out of contact with each other in said top and bottom members of said frame, said article being enclosed within said enclosed space, a means for supporting said envelope within the container in a desired position, a first mass of cellular plastic material supporting said bottom side of said envelope within said container in said desired position and a second separate mass of cellular plastic material supporting said top side of said envelope within said container in said desired position.

6. The package according to claim 5 wherein said plastic material is polyurethane.

References Cited by the Examiner

UNITED STATES PATENTS

| Re. 24,767 | 1/1960 | Simon et al. | 206—46 |
|---|---|---|---|
| 2,681,142 | 6/1954 | Cohen | 206—46 |
| 2,897,641 | 8/1959 | Simon et al. | 53—5 |
| 2,978,099 | 4/1961 | Bush | 206—65 |
| 2,985,287 | 5/1961 | Schulz | 206—46 |
| 2,994,425 | 8/1961 | Honeycutt | 206—46 |
| 3,061,089 | 10/1962 | Higgins | 206—65 |
| 3,066,382 | 12/1962 | Zweigle et al. | 206—46 |

FOREIGN PATENTS 467,281  8/1950  Canada.

THERON E. CONDON, *Primary Examiner.*

EARLE J. DRUMMOND, *Examiner.*